(12) United States Patent
Chyc et al.

(10) Patent No.: US 7,423,628 B2
(45) Date of Patent: Sep. 9, 2008

(54) TRACK WHEEL WITH REDUCED SPACE REQUIREMENTS

(75) Inventors: Paul Chyc, Broomfield, CO (US);
Steven Green, Waterloo (CA)

(73) Assignee: Research In Motion Limited, Waterloo (CA)

( * ) Notice: Subject to any disclaimer, the term of this patent is extended or adjusted under 35 U.S.C. 154(b) by 778 days.

(21) Appl. No.: 10/788,973

(22) Filed: Feb. 27, 2004

(65) Prior Publication Data

US 2005/0190146 A1 Sep. 1, 2005

(51) Int. Cl.
G09G 5/00 (2006.01)
G06F 3/033 (2006.01)
A63F 9/24 (2006.01)

(52) U.S. Cl. .......................... 345/156; 345/184; 463/37
(58) Field of Classification Search .......... 345/156–184
See application file for complete search history.

(56) References Cited

U.S. PATENT DOCUMENTS

| 5,086,296 | A | * | 2/1992 | Clark | 345/157 |
|---|---|---|---|---|---|
| 5,088,070 | A | * | 2/1992 | Shiff | 368/10 |
| 5,191,320 | A | * | 3/1993 | MacKay | 345/184 |
| 5,473,345 | A | * | 12/1995 | Dorst | 345/167 |
| 5,825,353 | A | | 10/1998 | Will et al. | |
| 6,094,190 | A | | 7/2000 | Kodim et al. | |
| 6,256,011 | B1 | * | 7/2001 | Culver | 345/157 |
| 6,300,938 | B1 | * | 10/2001 | Culver | 345/156 |
| 7,119,789 | B1 | * | 10/2006 | Shaw et al. | 345/156 |
| 2003/0094354 | A1 | | 5/2003 | Badarneh | |
| 2004/0155862 | A1 | * | 8/2004 | Higginson | 345/156 |

FOREIGN PATENT DOCUMENTS

GB  2 389 644 A  12/2003

* cited by examiner

*Primary Examiner*—Richard Hjerpe
*Assistant Examiner*—Mahmoud Fatahi Yar

(57) ABSTRACT

An input generating device for use in a hand held electronic device having a housing includes a core formed in a planar and semicircular in shape, forming a peripheral edge extending around said core and a track slidably engaged with the peripheral side edge. A curved portion of the peripheral edge extends outwardly from the housing allowing access thereto by the user. A first input is generated by sliding movement of the flexible track relative to the core. First input detection means, such as a turns encoder switch detects the sliding movement of the track. The core is depressibly mounted within the housing, generating a second input when the core is depressed. A second input detection means, such as a tactile contact switch detects depression of the core.

18 Claims, 6 Drawing Sheets

TRACK WHEEL WITH REDUCED SPACE REQUIREMENTS

BACKGROUND OF THE INVENTION

The present invention relates to an input generating device such as a track or scroll wheel for hand held electronic devices.

Input generating devices such as track wheels or scroll wheels are used to generate inputs associated with the operation of compact electronic devices and wireless devices such as personal digital assistants (PDAs), cell phones, pagers, organizers and other hand held electronic and/or wireless devices. Typically, track wheels are rotationally and often depressibly mounted within the device for on screen functioning such as navigation and selection, with a portion of the wheel extending outwardly from the electronic device housing, accessible by the user for rotation and depression thereof. To achieve maximum convenience and usability, the scroll wheels are typically of a certain minimum circumference. Hand held electronic devices generally have limited internal space for housing such scroll wheels or track wheels. Furthermore, as the size of the devices which utilize track wheels or scroll wheels for on-screen navigation and/or selection functioning has been reduced in order to enhance the convenience to the user, the amount of space taken up by the scroll wheel within the device is becoming relatively greater. In many instances, track or scroll wheels of standard size take up too much space within the device. Simply reducing the size of the wheel would certainly reduce the amount of space occupied by wheel in the device, however, by doing so, the user experience would be downgraded by not being able to operate the track wheel in a convenient manner.

There is a need for an input generating device comparable to a track or scroll wheel which generates inputs associated with the operation of hand held electronic devices, the input generating device having reduced space requirements while at the same time being cost effective to manufacture and being comfortable and efficient to use.

SUMMARY OF THE INVENTION

In an example of the invention there is provided an input generating device comprising: a core, a flexible track slidably engaged with the core, whereby a first input is generated by sliding movement of the flexible track relative to the core. In accordance with a further example of the invention, the input generating device comprises a first input detector which detects the first input generated by sliding movement of the flexible track.

In a further example of the invention, the core forms a peripheral edge extending around its entirety, and the flexible track is slidably engaged within a channel formed around the peripheral edge for movement in a first direction and an opposite direction.

In yet a further example of the invention, the input generating device further comprises a depressible component, whereby a second input is generated by depression of said depressible component and a second input detection means detects the second input.

In yet another further example of the invention, there is provided an input generating device for use in a hand held electronic device having a housing. The input generating device comprises a core mounted within said housing, a flexible track is slidably engaged with the core, whereby a first input is generated by sliding movement of the flexible track relative to the core, a portion of the core and track protruding outside said housing allowing access thereto by the user, the input generating device including first input detection component for detecting the first input generated by sliding movement of the track. The input generating device may further comprise a depressible component, depressibly mounted to the housing, generating a second input when the depressible component is depressed and a second input detection means for detecting said second input. In a further example of the invention, the hand held electronic device with which the input generating device may be used includes a display screen, and the first and second input detection means may be coupled to the display screen by a processor, the first and second inputs directing navigational and selection functions on the display screen, respectively.

BRIEF DESCRIPTION OF THE DRAWINGS

Embodiments of the present invention will now be described, by way of example only, with reference to the attached Figures, wherein.

Like reference numerals are used throughout the Figures to denote similar elements and features.

DETAILED DESCRIPTION

Figure 1:
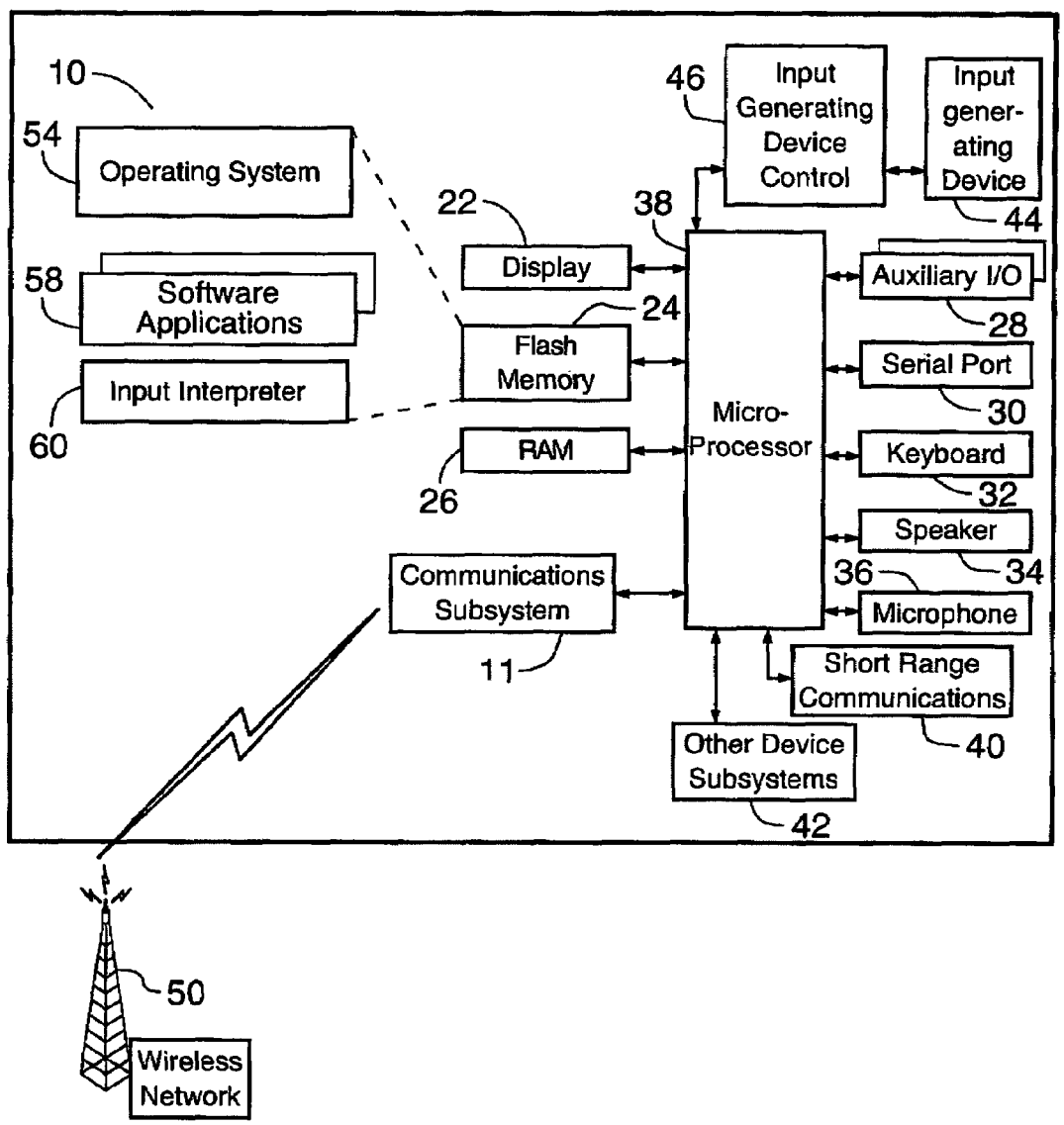
FIG. 1 is a block diagram of a mobile device and a communications system to which embodiments of the present invention may be applied.

Referring to FIG. 1, there is a block diagram of a mobile device 10 to which example embodiments of the present invention may be applied. In one example embodiment, the mobile device 10 is a hand-held two-way mobile communication device 10 having at least data and possibly also voice communication capabilities. In an example embodiment, the device has the capability to communicate with other computer systems on the Internet. In various embodiments, mobile device 10 is a data communication device, a multiple-mode communication device configured for both data and voice communication, a mobile telephone, a PDA (either enabled or not enabled for wireless communications), 1-way or 2-way pagers and/or any type of mobile electronic device having a keyboard or keypad and on-screen display. In the presently described embodiment, the mobile device 10 is configured to operate within a wireless network 50.

The device 10 includes a communication subsystem 11 for communicating with the wireless network 50. As will be apparent to those skilled in the field of communications, the particular design of the communication subsystem 11 will be dependent upon the communication network in which the device is intended to operate. Wireless mobile network 50 is, in an example embodiment, a wireless packet data network which provides radio coverage to mobile devices 10, although it could be any other types of wireless networks.

The device 10 includes a microprocessor 38 that controls the overall operation of the device. The microprocessor 38 interacts-with communications subsystem 11 and also interacts with further device subsystems such as the display 22, flash memory 24, random access memory (RAM) 26, auxiliary input/output (I/O) subsystems 28, input generating device 44, serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

Figure 2:
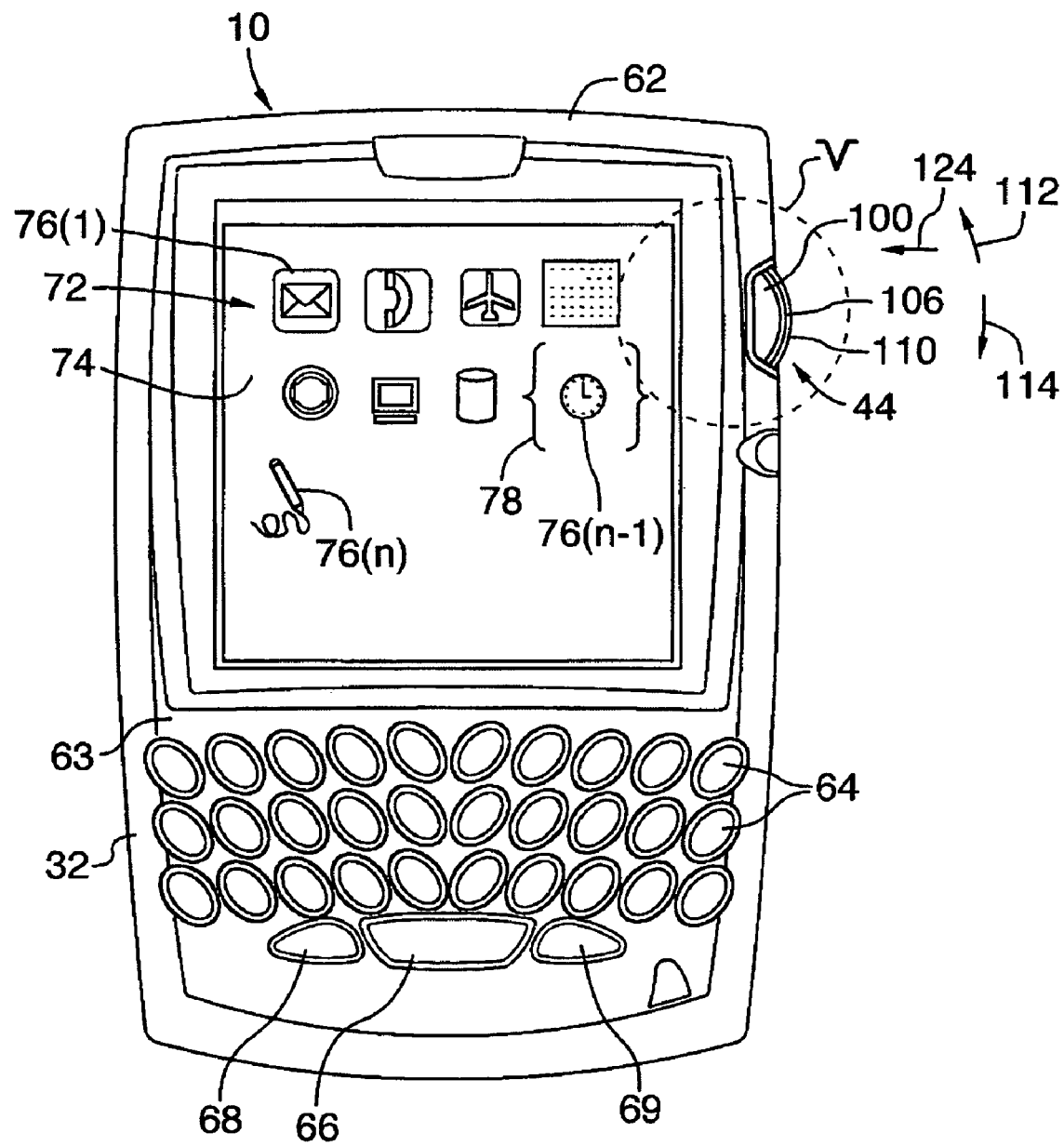
FIG. 2 is a front or plan view of a mobile device according to example embodiments with which the invention may be utilized.

With reference to FIG. 2, in an example of a hand held device used with the invention, the components and subsystems of mobile device 10 are housed within a rigid housing 62 that is configured to be held with one or two hands while the device 10 is in use. The mobile device 10 is, in various example embodiments, small enough to fit inside a standard purse or suit jacket pocket. In the example embodiment of FIG. 2, the keyboard 32 is horizontally positioned symmetrically between a left edge and a right edge of a face 63 of the device 10. The keyboard 32 includes character input buttons or keys for user input of displayable characters, such as substantially similarly sized alphanumeric buttons or keys 64. The keyboard 32 also includes non-alphanumeric command or control buttons such as space key 66, CAP key 68 and CTRL key 69. In the example embodiment of FIG. 2, the keys on the face of device 10 are positioned to be actuated by the thumbs of the user while the back of the device 10 is supported by the fingers of the user. In one example embodiment, alphanumeric keys 64 and space bar key 66 are arranged in a QWERTY-style or Dvorak-style keyboard having the plurality of alphanumeric keys 64 arranged in a plurality of rows across the face 63 of case 62. Alternative keyboard layouts and configurations are used in other embodiments of device 10.

As discussed, an example embodiment of the invention may be utilized with a hand held device, such as for example handle held device 10. It should be understood that the invention herein, may be utilized with any hand held electronic device such as personal digital assistants (PDAs), cell phones, pagers, organizers and other hand held electronic and/or wireless devices in a similar manner to that described herein.

An example of the input generating device 44 of the invention includes core 100 depressibly mounted by means of a carriage 102 (shown schematically) which itself mounted within the housing, and in particular to circuit board 104. In its resting position, shown in FIGS. 2 and 5, the core 100 is biased outwardly from the inside of the housing 62. The core 100 is formed in a planar and semicircular shape, forming a peripheral edge 106 extending around the entirety thereof. In the embodiment shown in FIGS. 2 and 5 to 7, a channel 108 is formed within the peripheral edge 106. A flexible track 110 is slidably engaged within said channel for movement in a first direction indicated by arrow 112 and an opposite direction indicated by arrow 114. The flexible track may be a single flexible piece, as shown in the Figures, or a plurality of track segments connected in series (not shown). The track is formed of a suitably resilient and flexible material, such as plastic, or synthetic rubber or the like, to create a feel comparable to a typical track wheel, when the user urges the track for sliding movement relative to the core. The track may include a gripping surface, which makes easier the user's urging of the track for sliding movement.

Figure 5:
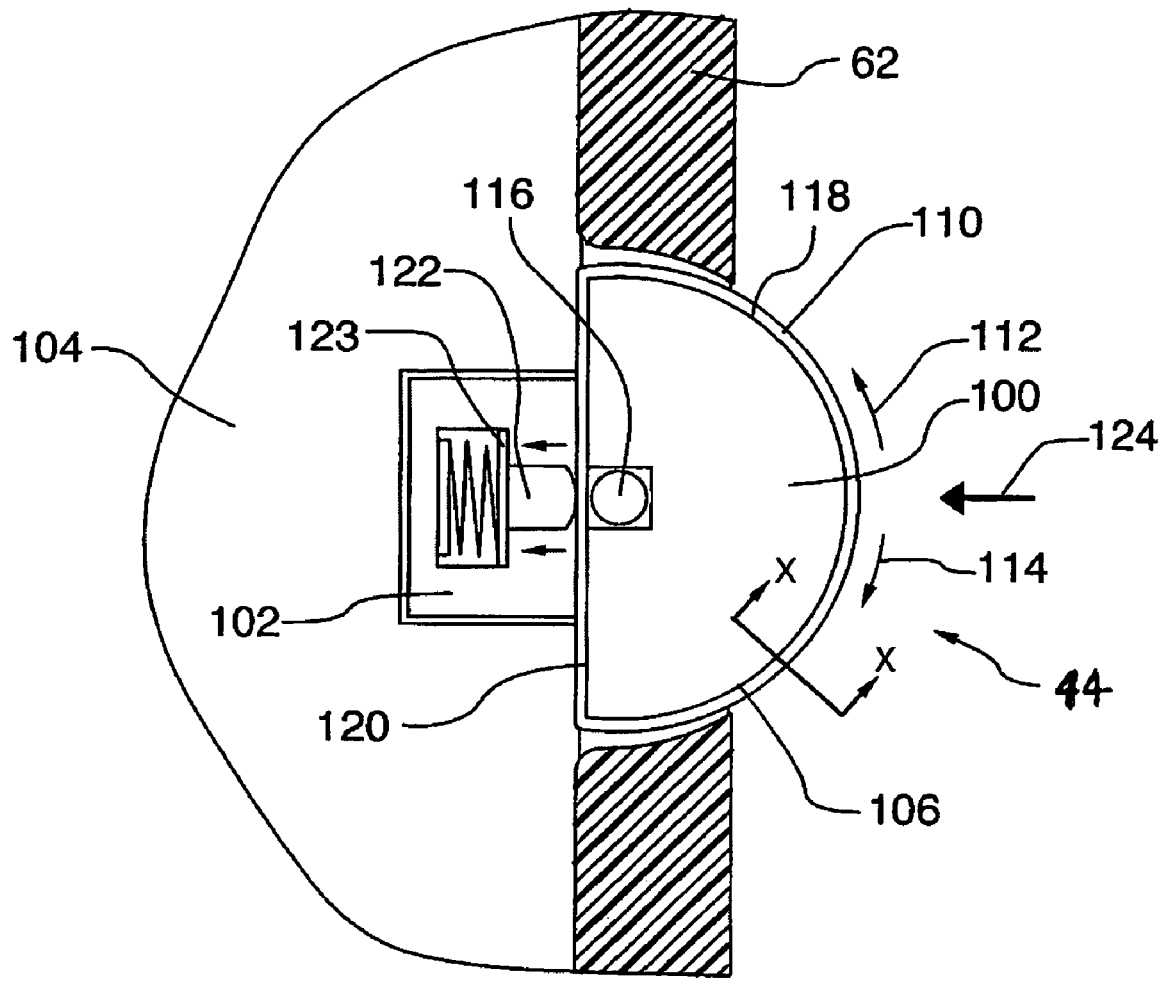
FIG. 5 is an enlarged partly broken away view of the portion of FIG. 2 in chain dotted circle V, showing an example of the invention in a resting position.
Figure 6:
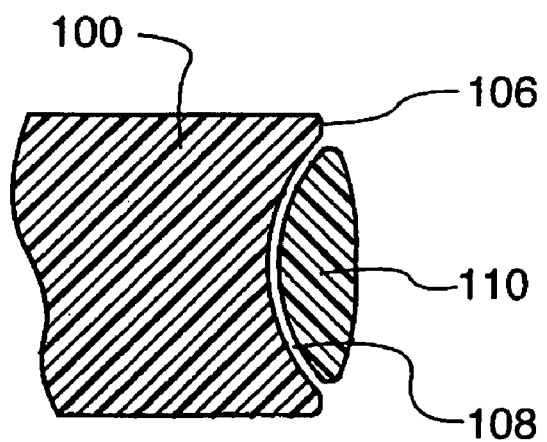
FIG. 6 is a partial sectional view the device, taken along lines X-X of FIG. 5, showing a portion of an example embodiment of the input generating device of the invention.
Figure 7:
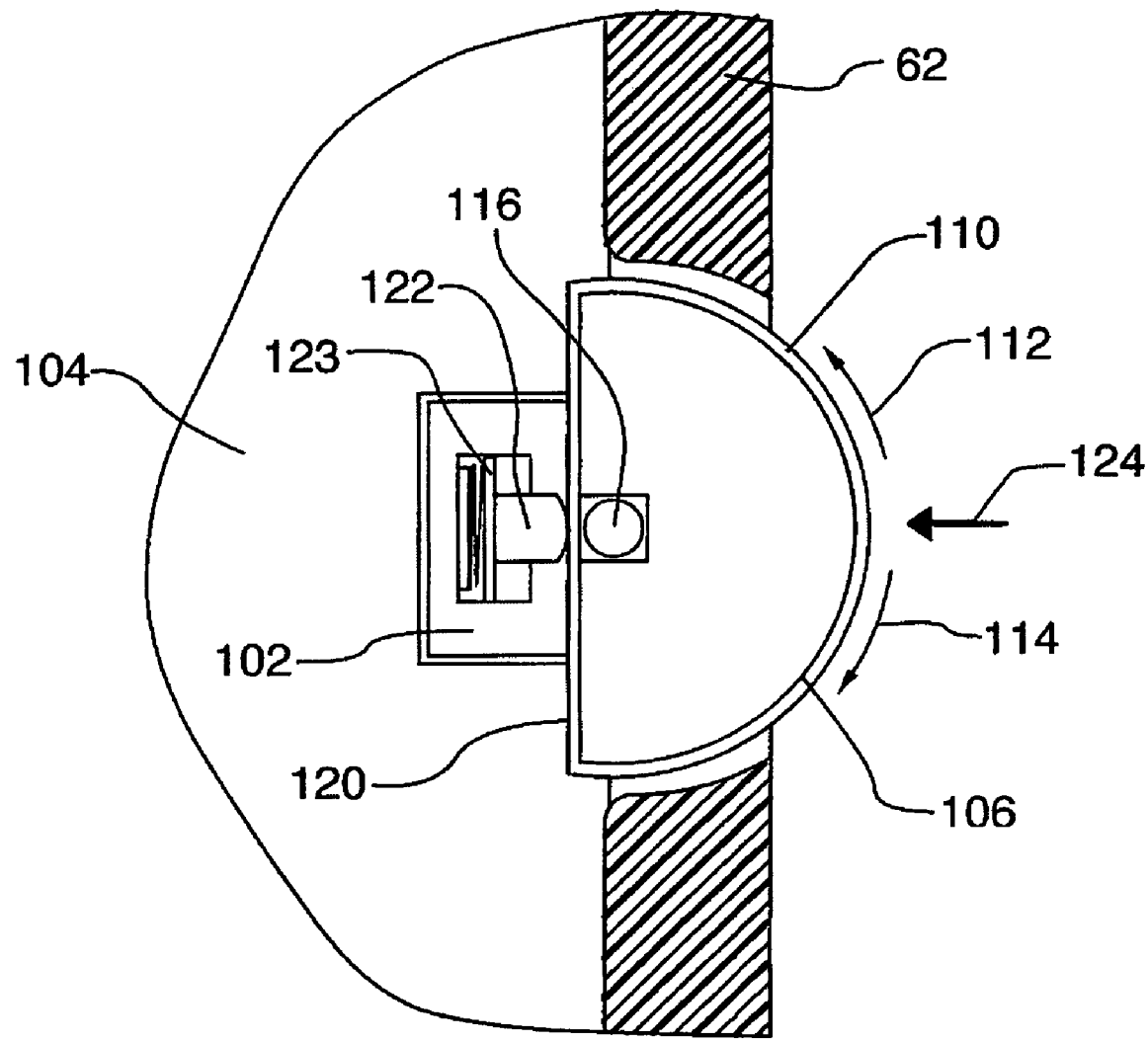
FIG. 7 is an enlarged partly broken away view-corresponding to that of FIG. 5 showing an example of the invention in a depressed position.

A first input is generated by sliding movement of the flexible track relative to the core. The input generating device 44 includes first input detection means, such as for example a turns encoder 116 which detects the first input generated by sliding movement of the flexible track. The turns encoder 116 can take various forms, by way of non limiting examples, it may include mechanical, optical and/or magnetic sensors for detecting sliding movement of the track 110 relative to the core 100. In operation, a user may urge the track to slide in first direction (arrow 112) and opposite direction (arrow 114) about the peripheral edge 106 of the core, thereby generating inputs which are detected by input detection means, such as for example, the turns encoder 116. As can be seen in FIGS. 2, 5 and 7, a curved portion 118 of the peripheral edge 106 extends outwardly from the housing, with a flat portion 120, positioned within the housing.

In the embodiment shown in the Figures, the input generating device includes a depressible component, such as spring loaded button 122, which is mounted within the housing 62 on carriage 102 and subsequently makes an electrical connection with circuit board 104. In the example embodiment shown in FIGS. 2, 5 and 7, core 100 is supported for sliding movement by a carriage 102, which itself is mounted on circuit board 104. The core 100 and carriage 102 are positioned such that the core 100 may be depressed in the direction indicated by arrow 124, against depressible component such as for example, spring loaded button 122. The spring loaded button 122 includes a tactile contact switch 123. Depression of the core 100 against spring loaded button, such as is shown in FIG. 7, generates a second input which is detected by second input detection means, such as for example tactile contact switch 123. In an example embodiment of the invention, depression of the core 100 against spring loaded button 122 with tactile contact switch 123 may provide click like tactile feedback to the user. Spring loaded button 122 tends to urge the core back to its resting position, such as is shown in FIG. 2 and 5.

It should be understood that the tactile contact switch and button 122 may be positioned beneath or above the core, and depression of the core in the direction of the tactile contact switch would cause the tactile contact switch to detect the input generated by depression of the core. In order to conserve space, in an alternate embodiment, the push button and contact switch may be located within the perimeter of the core. In a further alternate embodiment, the core is mounted to the carriage, but not in sliding engagement therewith and the spring loaded button is positioned directly on the core such that the user may depress the spring loaded button directly to activate the tactile contact switch.

It should be understood that other types of movement detectors such as optical or magnetic based sensors, can be used instead of the tactile contact switch for sensing depression of the depressible component such as button 122. It should be further understood that one or more depressible components, such as for example, spring loaded button 122 (including a tactile contact switch 123 or other type depressive movement sensor), may be positioned on the core itself, positioned to be depressed by the user directly to generate and detect an input.

In an alternate example of the invention, the core may directly engage a pressure sensitive switch mounted within the housing, such as on carriage 102 which detects pressure when pressing the core 100 against it. Alternately, a pressure switch may be included within the core, to detect pressure there against.

In the example embodiment, the curved portion 118 extending outwardly from the housing 62, is comparable in circumference to a standard sized scroll wheel. The core 100 takes up less room within the housing of the hand held device 10 than would a standard scroll wheel since the core is semi circular in shape. It should be understood that although the embodiment shown in the Figures is semi circular in shape, the core may be formed in any suitable shape. For example, the portion of the core within the housing 62 may be concave or of reduced curvature relative to the portion extending out of the housing or any other shape which would reduce the space taken up within the housing 62 of the hand held device 10.

As can be seen in Figures, in an example embodiment, the input device is positioned on the side edge of the housing 62, with a portion of the core accessible by the user for urging the sliding movement of the track in directions 112 and 114, and for depressing the core in direction 124. It should be understood that the input generating device 44 may be positioned in any suitable place so long as a portion of the core 100 and track 102 may be accessed for urging sliding movement of the track and for depressing the core or depressible component to generate the respective inputs. An example of an alternate placement of the input generating device would be on the face of the housing, below the keyboard.

As discussed above, as shown in the Figures, the invention herein may be utilized with a hand held electronic device 10, comprising a display screen 72. As will be discussed below, first and second input detection means, such as turns encoder 116 and the tactile contact switch 123 may be coupled to the display screen by a processor, the sliding movement of the track directing a navigational function and the depressive movement of the depressible component directing a selection function on said display screen, respectively.

With reference to FIG. 1, among the software applications or modules resident on device 10 is an input interpreter 60 that maps various inputs received by the microprocessor 38 from keyboard 32 and input generating device 44 to associated character and control codes and provides such codes to the operating system 54 and/or software applications 58. In various embodiments, the functions of the input interpreter may be partly or completely integrated into the operating system 54 and/or other software applications 58.

With reference again to FIG. 2, the display system 22 of the device 10 includes a display screen 72 that is vertically positioned between the keyboard 32 and a top edge of the device face and horizontally positioned symmetrically between the left edge and the right edge of the device face 63. In various non-limiting examples of alternative embodiments, the display screen 72 may be housed in a housing that is pivotally mounted to the casing housing the keyboard, or the keyboard may be divided into two sections in housing case 62 with the display screen being located between the keyboard sections.

The device 10 is configured to operate in different user input modes under the control operating system 54 and software applications 58. For example, FIG. 2 shows a visual user interface 74 for a menu item selection mode in which a plurality of menu items 76 such as application or folder icons 76(1) to 76(n) (referred to generically herein by reference 76) are displayed, each of which is selectable to link to or launch an associated application or open an associated folder. According to example embodiments of the present invention, when the device 10 is operating in a menu item selection mode, a user can move an on-screen position indicator 78, commonly referred to as a caret or cursor, through the menu items 76 by urging the sliding movement of the track 1-10 in direction indicated by arrow 112 and opposite direction 114. When a menu item is highlighted or focussed by the on-screen indicator 78, depressing the core 100 in direction 124, causes depression of spring loaded button 122 and tactile contact switch, which results in selection of the focussed item. In the menu item selection mode, sliding the track 110 in the direction indicated by arrow 112 towards the top edge of the device causes the on-screen indicator 78 to move backwards through the menu items 76, and sliding the track in the opposite direction indicated by arrow 114 towards the bottom edge causes the on-screen indicator 78 to move forwards through the menu items 76. In a user interface where the selectable menu items are displayed in a plurality of rows such as shown in FIG. 2, scrolling backwards through the items will generally involve moving the on-screen indicator 78 from right to left over the items in a row. A line wrap around affect is achieved in that when the left-most item in a row is reached, the on-screen indicator 78 is then moved to the right-most item in the previous row. Forward scrolling has the opposite affect. As discussed above, more than one depressible component may be utilized. For example, a pair of depressible push buttons, may be each accessible by the user for depression thereof. In an example application of such a feature, the button in the pair of buttons may be selectively depressed for navigation of the on screen indicator 78. For example, pressing a first button to scroll backwards through the menu items and pressing the other button to scroll forwards.

Figure 3:
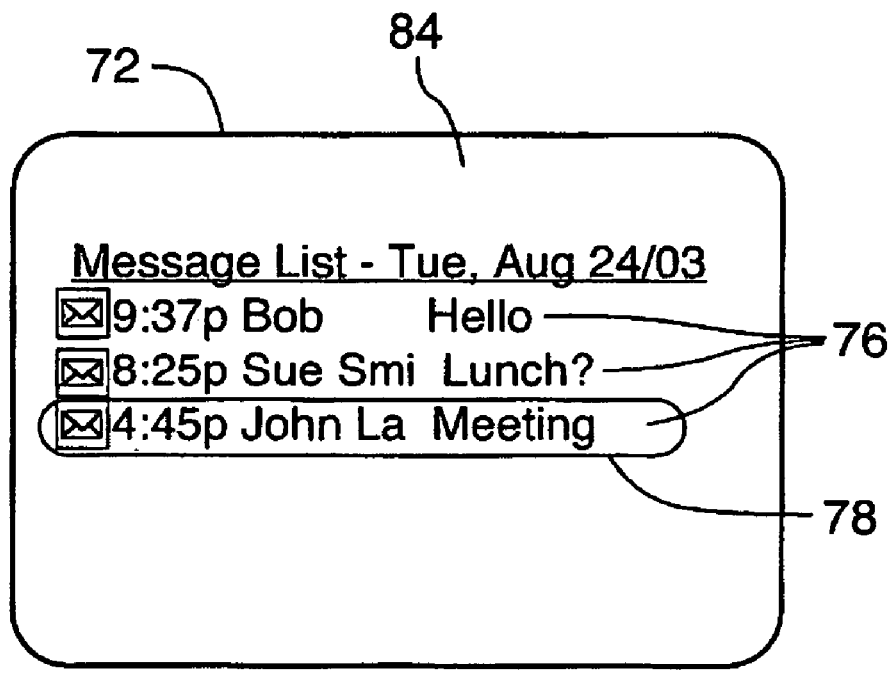
FIG. 3 shows a further visual user interface as displayed on a display screen of the device of FIG. 2.
Figure 4:
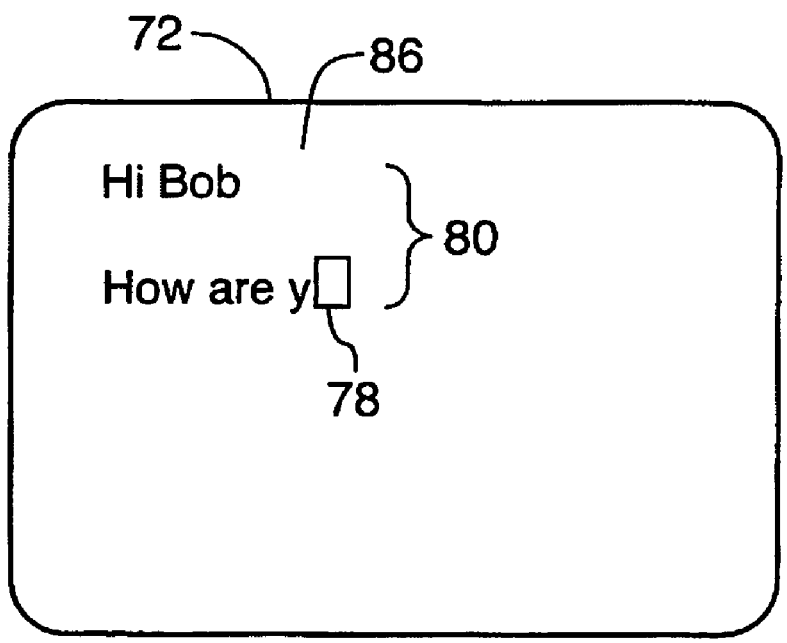
FIG. 4 shows yet a further visual user interface as displayed on a display screen of the device of FIG. 3.

It will be appreciated that selectable menu items can be displayed in a number of different configurations on the display screen 72. For example, FIG. 3 shows a further example of a menu item selection mode user interface 84 in which the selectable menu items 76 are mail message items arranged in a vertical list, each of which can be focussed on by on-screen indicator 78 and then selected to link to a full display of an associated mail message. Movement of the on-screen indicator 78 through the vertical list of menu items presented in interface 84 using input generating device 44, and selection of focussed menu items, is similar to the navigation through and selection of menu items described above in respect of interface 74, except that the on-screen indicator only moves upwards and downwards through the vertical list, rather than horizontally. Urging "downward" sliding movement of the track 110 in the direction indicated by arrow 114 results in forward scrolling through the listed items, and "upward" sliding movement in the direction indicated by arrow 112 of the track 110 results in backward scrolling through the listed items.

Figure 8:
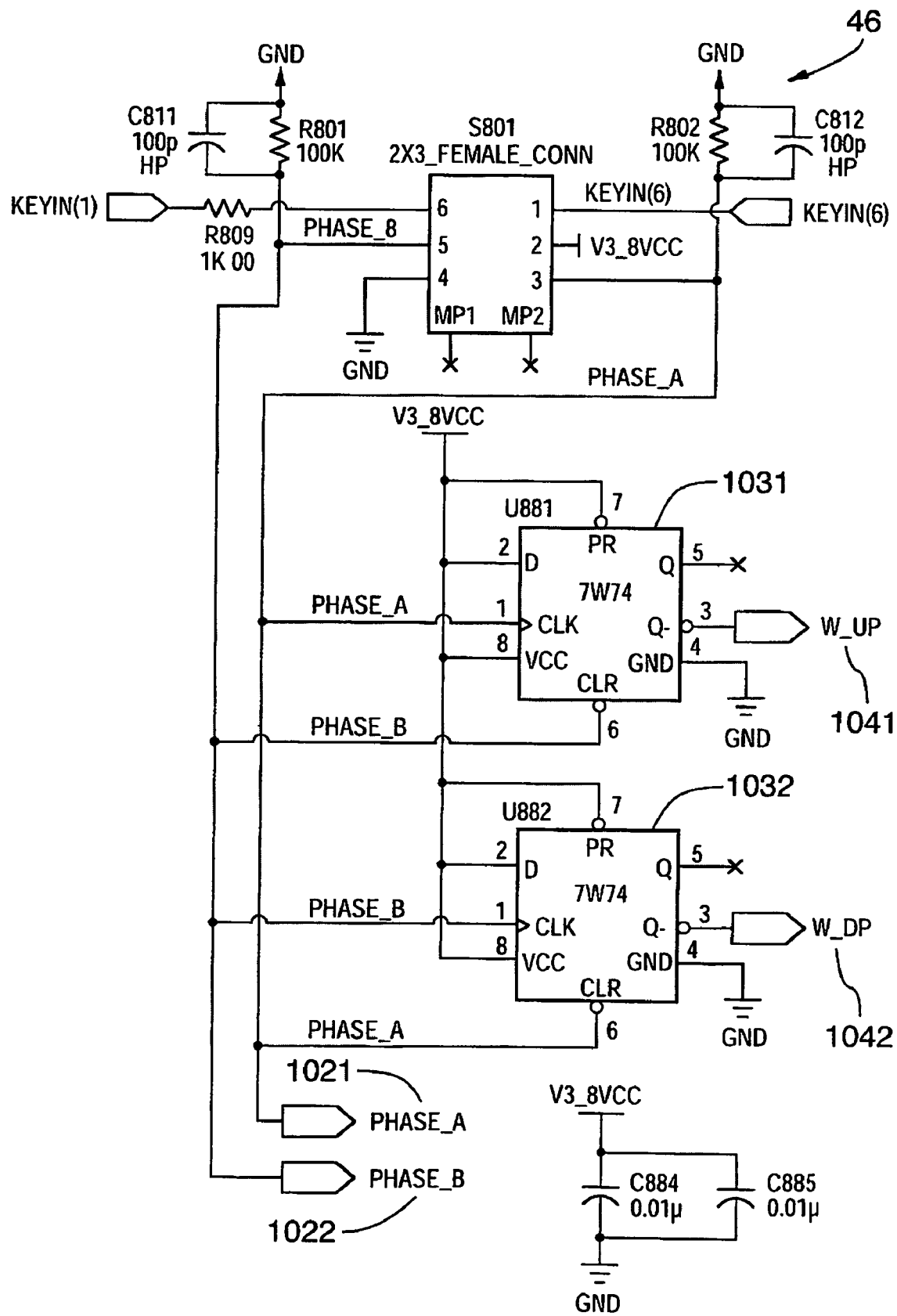
FIG. 8 is a block diagram of an example input generating device control circuit.

FIG. 8 is an example of typical logic circuitry 46 associated with the turns encoder switch 116 of input generating device 44. This diagram is meant for example purposes only and as one skilled in the art would understand, logic circuitry for an input generating device is not limited to this example. The turns encoder switch 116 of the input generating device 44 generates quadrature signals phase A 1021 and phase B 1022, which are processed by D flip-flops 1031 and 1032 to present signals 1041 W_UP and 1042 W_DN to microprocessor 38. Signals 1041 and 1042 represent, respectively, a user sliding the track upwardly (in the direction of arrow 112 of FIGS. 2 and 5) and sliding the track downwardly (in the direction of arrow 114 of FIGS. 2 and 5). As noted above, the input generating device 44 has measurable sliding and depressible input movements. The tactile contact switch 123 provides an input signal to the microprocessor 38 representing a user depressing the depressible component such as for example button 122 which is caused to be depressed by depression of the core 100 along carriage 102 in the direction of arrow 124.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. An input generating device positioned at a side of an electronic device comprising:
   core formed to have two parallel planar surfaces, said core including a peripheral edge around the entirety of said core; and
   a flexible track slidably engaged with the core for movement only in a first direction and a second direction, where said second direction is opposite said first direction;
   said core including a channel formed in said peripheral edge, such that said flexible track is slidably engaged with said core within said channel;
   whereby a first input is generated by sliding movement of the flexible track relative to the core in said first direction.

2. An input generating device as recited in claim 1 further comprising a first input detection means for detecting the first input generated by said sliding movement of the flexible track.

3. An input generating device as recited in claim 2 wherein said input detection means is a turns encoder which detects sliding movement of the track.

4. An input generating device as recited in claim 1 wherein said two parallel planar surfaces are of a semi circular shape.

5. An input generating device as recited in claim 1 wherein said flexible track is a single flexible piece, extending around said peripheral edge.

6. An input generating device as recited in claim 1 wherein said flexible track comprises a plurality of track segments attached to each other in series.

7. An input generating device as recited in claim 1, wherein said input generating device further comprises a depressible component, whereby a second input is generated by depression of said depressible component.

8. An input generating device as recited in claim 7 further comprising a second input detection means for detecting the second input.

9. An input generating device as recited in claim 8 wherein said second input detection means is a tactile contact switch, which detects an input when the depressible component is depressed.

10. A input generating device as recited in claim 9 wherein said tactile contact switch provides a click like tactile feedback to the user when depressed.

11. An input generating device as recited in claim 9 wherein said core is mounted in sliding engagement with a carriage, said depressible component being positioned such that urging the core to slide along the carriage, causes the core to engage and depress the depressible component, and activate the tactile contact switch.

12. An input generating device for use in a hand held electronic device and positioned at a side of a housing thereof, said input generating device comprising:
   a core formed to have two parallel planar surfaces and a peripheral edge extending around said core, said core mounted within said housing,
   a flexible track slidably engaged with the core for movement only in a first direction and a second direction, where said second direction is opposite said first direction,
   said core including a channel formed in said peripheral edge, such that said flexible track slidably engages with said core within said channel;
   whereby a first input is generated by sliding movement of the flexible track relative to the core in said first direction,
   a portion of the core and track protruding outside said housing allowing access thereto by a user,
   the input generating device including a first input detection component for receiving said first input generated by said sliding movement of the track.

13. An input generating device as recited in claim 12 wherein said first input detection component is a turns encoder, which senses sliding movement of the track relative to the core.

14. An input generating device as recited in claim 12 further comprising:
   a depressible component, depressibly mounted to the housing, generating a second input when said depressible component is depressed; and
   a second input detection component for detecting said second input.

15. An input generating device as recited in claim 14 wherein said depressible component is a spring loaded button, and said second input detection component is a tactile contact switch.

16. An input generating device as recited in claim 15 wherein said core is mounted in sliding engagement with a carriage, said depressible component being positioned such that urging the core to slide along the carriage, causes the core to engage and depress the spring loaded button and activate the tactile contact switch.

17. An input generating device as recited in claim 16 wherein:

said core is formed such that said parallel planar surfaces have a semicircular shape, and a curved portion of said peripheral edge extends outwardly from said housing.

18. An input generating device as recited in claim 14 wherein said hand held electronic device further comprises a display screen, said first and second input detection means being coupled to the display screen by a processor, said first input and said second input directing a navigational function and selection function on said display screen, respectively.

* * * * *